T. F. THOMPSON.
SPRAYER ATTACHMENT FOR CULTIVATORS.
APPLICATION FILED NOV. 5, 1920.
1,393,850.
Patented Oct. 18, 1921.
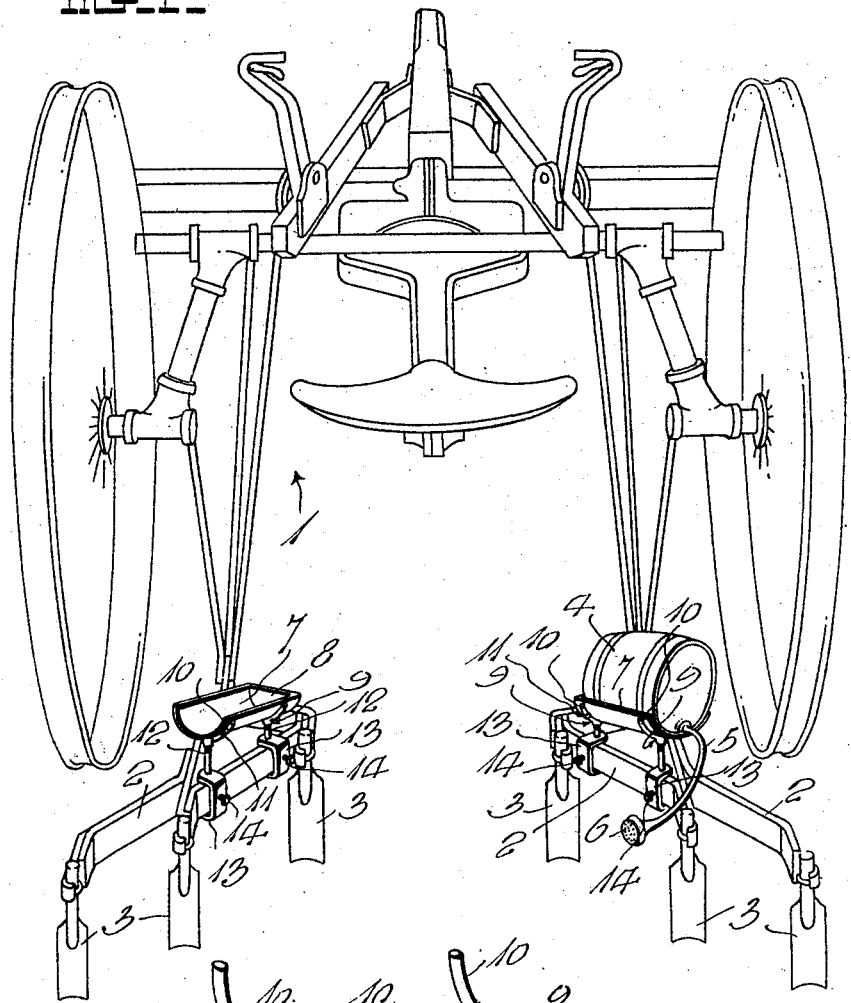
Inventor
T. F. THOMPSON
Witness
H. Woodard
By Latimer & Latimer
Attorneys

UNITED STATES PATENT OFFICE.

THEODORE F. THOMPSON, OF ASTORIA, SOUTH DAKOTA.

SPRAYER ATTACHMENT FOR CULTIVATORS.

1,393,850.   Specification of Letters Patent.   Patented Oct. 18, 1921.

Application filed November 5, 1920. Serial No. 422,059.

*To all whom it may concern:*

Be it known I, THEODORE F. THOMPSON, a citizen of the United States, residing at Astoria, in the county of Deuel and State of South Dakota, have invented certain new and useful Improvements in Sprayer Attachments for Cultivators; and I do declare the following to be a full, clear, and exact description of the invention, such as will enable others skilled in the art to which it appertains to make and use the same.

This invention relates to an improved attachment for a cultivator and one object of the invention is to provide an attachment so constructed that a sprayer may be supported above one of the shovel carrying beams of the cultivator, a plurality of sprayers being provided if the attachment is duplicated and the sprayers being so mounted that they will be out of the way and will take up a comparatively small amount of room.

Another object of the invention is to so construct the attachment that it may be used in connection with a conventional construction of cultivator thus making it possible to use the attachment in connection with a cultivator of a conventional construction and already in use.

Another object of the invention is to so construct the attachment that a trough forming part of the same may be supported by brackets having standards which pass through alined openings formed in U-shaped clamps which engage the shovel beams of a cultivator, a set screw being provided and carried by the clamps to engage the cultivator beams, which set screw when tightened moves the clamp to bring the stems of the brackets into engagement with the shovel beam and thus causes the clamps and brackets to be securely held by friction in a set position.

Another object of the invention is to provide a device of the character described which can be easily adjusted to the proper position and which may be easily and quickly put in place or removed.

This invention is illustrated in the accompanying drawings wherein:

Figure 1 is a perspective view showing a conventional structure of cultivator with the improved attachment in place.

Fig. 2 is an enlarged perspective view showing the brackets and clamps in connection with a portion of a shovel beam.

Fig. 3 is an enlarged sectional view taken along the line 3—3 of Fig. 2.

This improved device is used in connection with a cultivator which is indicated in general by the numeral 1 and is of a conventional construction and provided with shovel beams 2 which are also of a conventional construction and carry shovels 3. In the illustration, the sprinkler will consist of barrels which will be supported above the shovel carrying beams and will extend longitudinally thereof. One of these barrels 4 is shown in Fig. 1 and is provided with an outlet pipe 5 having a spraying nozzle 6 for spraying a disinfectant or bug-killing liquid upon plants while the plants are being cultivated by the cultivator and the earth about the plants broken up by the shovels 3. This barrel rests within a trough 7 which is provided with a head 8 at one end and will be formed of heavy sheet metal but may be formed of any other suitable material if desired. The trough is supported by brackets 9 which are provided with arms or forks 10 curved longitudinally to conform to the transverse curvature of the trough. These arms will engage the trough as shown in Fig. 1 and the trough will be provided with eyes 11 for engaging the arms of the brackets and thus preventing the trough from moving longitudinally. Each bracket will only have one arm engaged by an eye thus permitting the brackets to be easily connected with the trough. These brackets are constructed as clearly shown in Fig. 2 and each is provided with a stem or shank 12 which extends through alined openings formed in the upper and lower arms of the U-shaped clamps 13. The clamps 13 will engage the shovel beams and when the stems or shanks of the brackets are passed through the openings formed in the arms of the clamps, the shovel beams will extend through the clamps and between the clamps and the stems of the brackets as shown clearly in Fig. 3. It will thus be seen that when the set screws 14 of these clamps are tightened, the clamps will be moved to bring the stems of the brackets into tight binding engagement with the shovel beams and thus the clamps will be tightly secured against movement longitudinally of the shovel beams, and the brackets will be secured against vertical movement. Therefore when the device is put in place, the brackets can be vertically adjusted to place the barrel in the desired position with the barrel either placed horizontal or at a desired incline for proper flow of the liquid through the discharge pipe 5. In view of the fact that the only securing means consists of a set screw for each of the clamps, it will be readily seen that the device can be very easily and quickly put in place and proper adjustment made, and further the attachment can be easily removed when no longer desired.

Having thus described the improved cultivator attachment, what is claimed is:

1. The combination with a cultivator including shovel beams, of sprayer supporting means comprising a receptacle holder, U-shaped clamps for engaging a cultivator beam, supporting brackets for the receptacle holder, each having a stem slidably mounted in openings formed in the arms of one of said U-shaped clamps, and set screws carried by said clamps and engaging the shovel bar to move the clamps into binding engagement with the stems of the brackets and hold the brackets in set positions.

2. The combination with a cultivator including shovel beams, of sprayer supporting means comprising a receptacle holding trough, supporting brackets each having arms engaging said trough and a stem, U-shaped clamps engaging the shovel beam and having their arms provided with openings slidably receiving the stems of said brackets and means securing the brackets on the shovel beam and drawing the clamps into binding engagement with the stems of the brackets.

3. The combination with a cultivator including longitudinally extending shovel beams, of a receptacle holding trough, clamps mounted upon one of said shovel beams for movement longitudinally and transversely thereof, brackets having stems slidable in openings formed in said clamps and arms engaging said trough, eyes carried by the trough and engaging the arms of said brackets, and set screws carried by the clamps for engaging the shovel beam and moving the clamps transversely thereof into binding engagement with the stems of said brackets.

4. A cultivator attachment of the character described comprising a receptacle holder, shovel beam engaging clamps for loosely engaging a shovel beam, brackets for supporting the receptacle holder having stems extending through openings in said clamps, and set screws carried respectively by the clamps for engaging a shovel beam passing through the clamps intermediate the set screws and bracket stems.

In testimony whereof I have hereunto set my hand.

THEODORE F. THOMPSON.